United States Patent [19]

Richardson

[11] 4,072,091
[45] Feb. 7, 1978

[54] PORTABLE ELECTRIC HEATING DEVICE FOR POPPING CORN

[75] Inventor: Victor M. Richardson, Brocton, N.Y.

[73] Assignee: The Raymond Lee Organization, Inc., a part interest

[21] Appl. No.: 719,173

[22] Filed: Aug. 31, 1976

[51] Int. Cl.² .............................................. A23L 1/18
[52] U.S. Cl. ................................ 99/323.5; 99/323.11; 219/214; 219/386; 219/432; 219/433; 219/521
[58] Field of Search ............... 219/214, 385, 386, 388, 219/389, 430, 432, 433, 438, 439, 521, 475; 99/323.4, 323.5, 323.6, 323.7, 323.8, 323.9, 323.11

[56] References Cited

U.S. PATENT DOCUMENTS

| 919,843 | 4/1909 | Fish | 219/433 |
| 1,028,383 | 6/1912 | Parkhurst | 219/432 |
| 2,863,037 | 12/1958 | Johnstone | 219/432 |
| 2,922,355 | 1/1960 | Green | 99/323.11 |
| 3,059,567 | 10/1962 | Lindemann | 99/323.11 |
| 3,087,413 | 4/1963 | Burroughs | 99/323.5 |
| 3,120,169 | 2/1964 | Echols, Jr. | 99/323.9 |
| 3,323,440 | 6/1967 | Grant | 99/323.5 |
| 3,545,832 | 12/1970 | Levenback | 219/214 X |
| 3,666,499 | 5/1972 | Isnor | 99/323.5 |
| 3,923,803 | 2/1960 | Kueser | 219/441 |

Primary Examiner—Volodymyr Y. Mayewsky

[57] ABSTRACT

A portable heating device for such applications as popping corn or heating liquids or infants' bottles of milk which employs a cup shaped member containing an electric heating element electrically insulated from the member which is disposed between an open relatively large round top end having an internal thread and a closed relatively small round bottom end having an external thread. An electrical connector is secured to the outside of the cup and is electrically connected to said element. A vertical cylindrically shaped sleeve open at its top end has a bottom end engaging the top end of the member. A vertically flexible hollow cylinder is disposed along side of the member and sleeve, the bottom end of the cylinder being closed, the top end being open. A hollow deflector chute extends between the sleeve and the cylinder, the chute having two spaced open ends, one chute end being connected to the top end of the cylinder, the other chute end being connected to the top end of the sleeve.

6 Claims, 6 Drawing Figures

U.S. Patent
Feb. 7, 1978
4,072,091
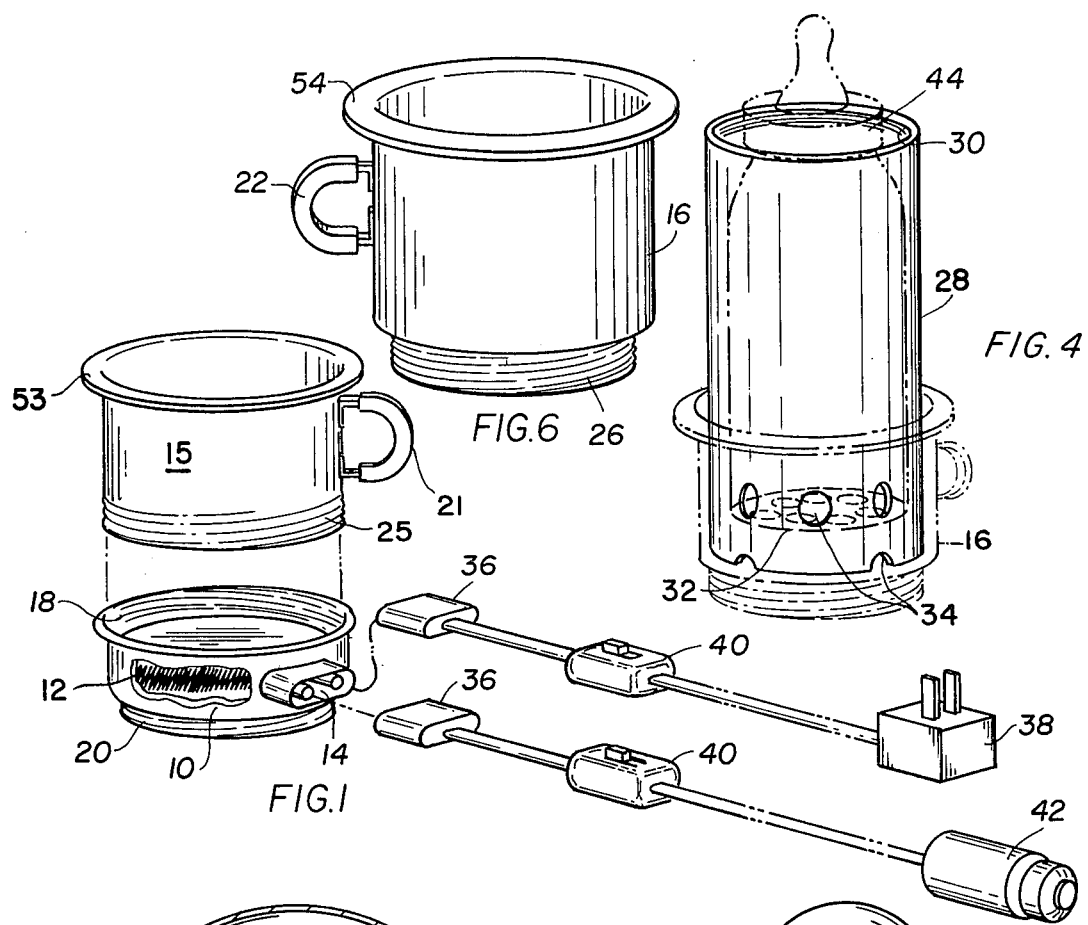

PORTABLE ELECTRIC HEATING DEVICE FOR POPPING CORN

SUMMARY OF THE INVENTION

This invention is directed toward a portable electric heating device which can be easily assembled for use or taken apart for cleaning and storage, which can be easily moved from place to place, which operates off a conventional alternating current source or an automobile battery, and which can be used in such applications as heating an infant's bottle of milk or popping corn or heating liquids.

In accordance with the invention a cup shaped member containing a heating element (which is electrically connected to a connector disposed on the outside of the member and is electrically insulated therefrom) has a round open relatively large top end with an internal thread and a round closed relatively small bottom end with an external thread. Means detachably connect the connector either to a conventional alternating current source of power such as a wall outlet or to the cigarette lighter connection of an automobile (which is connected to the battery of a vehicle).

A hollow sleeve open at top end has its bottom end threadedly engagable with the top end of the member. A third longer hollow sleeve open at both ends and slidable within a vertically flexible hollow cylinder is disposed along side of the member and sleeve, the bottom end of the cylinder being closed, the top end being open. A hollow deflector chute is disposed between sleeve and cylinder, the chute having two spaced open ends, one open end being connected to the top end of the sleeve, the other top end being connected to the top end of the cylinder.

When the sleeve is filled with popcorn and the element is heated, corn is popped and passes through the chute into the container.

BRIEF DESCRIPTION OF THE DRAWINGS

In the drawings:

FIG. 1 is a perspective view of the sleeve, member and connecting means;

FIG. 2 is a side view of the invention as used for popping corn;

FIG. 3 is an end view of the structure of FIG. 2.;

FIG. 4 shows the invention used for heating milk;

FIG. 5 is a top view of the structure of FIG. 2;

FIG. 6 is a perspective view of the second sleeve.

DETAILED DESCRIPTION OF PREFERRED EMBODIMENTS

Referring first to FIGS. 1, 2 and 3, a cup shaped member 10 contains a heating element 12 electrically insulated from the members and connected to a male type electric connector 14 secured to the outside surface of member 10. The top end of member 10 is open, round and has an internal thread 18. The bottom end of member 10 is closed, round but smaller in diameter than the top end and has an external thread 20.

A first hollow cup shaped sleeve 15 is open at a top end and is provided with handle 21. The bottom end of sleeve is closed and has an external thread 25, which can engage thread 18. The top end of sleeve 15 has an outer lip 53. When corn is to be popped, sleeve 28 acts as a base for member 10 and sleeve 15. Sleeve 15 is filled with popcorn. A hollow deflector chute 46 secured at one end by clip 47 to lip 53 and also connected on the other end to a collecting bag or vertically flexible hollow cylinder 48 having an open top end and a closed bottom end, all of which are supported in frame 50 or with hanging bracket assembly 56. Corn which is popped passes through the deflector chute and is collected in the cylinder.

Referring now to FIGS. 1, 4 and 6, a second hollow sleeve 16 is open at the top end and is provided with handle 22. The bottom end of sleeve 16 has a shoulder with an external thread 26 which can engage thread 18. The top end of sleeve 16 has an outer lip 54. In use, sleeve 16 is connected to member 10.

A third hollow sleeve 28 much longer than sleeve 16 has a top end with an internal thread 30 which can engage thread 20. The sleeve 28 is slidable in sleeve 16 and has a perforated bottom plate 32 disposed adjacent the bottom open end. This sleeve also has openings 34 in its wall above and below the plate.

Female connector 36 adapted for mating engagement with connector 14 is connected via cable and on-off switch 40 to an electric plug 38 which can be disposed in a wall connection for alternating current supply. A duplicate connector, cable and switch is connected to a device 42 adapted to fit into a cigarette lighter socket to receive direct current from an automobile battery.

In use, bottle 44 is disposed in sleeve 28 and rests upon plate 32. The bottle carrying sleeve is disposed in sleeve 16. Water is poured in and the milk in the bottle is warmed.

I claim:

1. A portable heating device for popping corn comprising:
   a cup shaped member containing an electric heating element disposed intermediate a top relatively large diameter round open end having an internal thread and a bottom relatively small diameter round closed end having an external thread, the element being insulated from the member;
   an electrical connector secured to the outside of the cup and connected electrically to said element;
   a vertical cylindrical shaped sleeve, open at its top end and having a bottom end threadedly engaging the top end of the member;
   a vertically flexible hollow cylinder disposed along side of the member and sleeve, the bottom end of the cylinder being closed, the top end being open; and
   a hollow deflector chute extending between the sleeve and the cylinder, the chute having two spaced open ends, one open end of the chute being connected to the top end of the sleeve, the other open end of the chute being connected to the top end of the cylinder whereby when the sleeve is filled with popcorn and the element is heated, corn is popped and passes through the chute into the container.

2. The device of claim 1 wherein a handle is secured to the outer surface of the second.

3. The device of claim 2 further including means including an on-off switch and an additional connector adapted to detachably engage the said electrical connector to connect said element to a source of power.

4. The device of claim 3 wherein said source is an alternating current source.

5. The device of claim 3 wherein said source is a battery.

6. The device of claim 1 wherein the bottom end of the container is disposed upon a horizontal surface and further including a vertical sleeve support having a bottom end disposed upon said surface, said member engaging the top end of the support.

* * * * *